(12) United States Patent
Patterson

(10) Patent No.: US 9,085,258 B2
(45) Date of Patent: Jul. 21, 2015

(54) LOADING RAMP ADAPTED TO BE CARRIED BY A TRUCK

(76) Inventor: Frankie Patterson, Dandridge, TN (US)

( * ) Notice: Subject to any disclaimer, the term of this patent is extended or adjusted under 35 U.S.C. 154(b) by 1853 days.

(21) Appl. No.: 11/752,325

(22) Filed: May 23, 2007

(65) Prior Publication Data

US 2008/0292438 A1 Nov. 27, 2008

(51) Int. Cl.
*B65F 3/00* (2006.01)
*B60P 1/43* (2006.01)
*B60P 3/07* (2006.01)

(52) U.S. Cl.
CPC .. *B60P 1/435* (2013.01); *B60P 3/07* (2013.01)

(58) Field of Classification Search
USPC ......................................... 414/537, 465, 466
See application file for complete search history.

(56) References Cited

U.S. PATENT DOCUMENTS

| | | | |
|---|---|---|---|
| 3,613,920 A | 10/1971 | Flamm | |
| 3,687,314 A | 8/1972 | Haugland | |
| 3,704,794 A | 12/1972 | Flamm | |
| 3,720,335 A | 3/1973 | Ward | |
| 3,726,423 A | 4/1973 | Miron | |
| 4,274,788 A | 6/1981 | Sutton | |
| 4,990,049 A | 2/1991 | Hargrove | |
| 5,380,141 A | 1/1995 | Flowers | |
| 5,393,191 A | 2/1995 | Alexander | |
| 5,603,600 A | 2/1997 | Egan et al. | |
| 5,649,732 A | 7/1997 | Jordan et al. | |
| 5,800,115 A | 9/1998 | Fenton | |
| 5,807,058 A | 9/1998 | Masse | |
| 5,829,945 A | 11/1998 | Stanley | |
| 5,879,123 A | 3/1999 | Blaikie | |
| 5,934,863 A | 8/1999 | Beck | |
| 6,076,215 A * | 6/2000 | Blankenship et al. | 14/71.1 |
| 6,099,232 A | 8/2000 | Dixson et al. | |
| 6,176,672 B1 | 1/2001 | Egan et al. | |
| 6,634,848 B2 * | 10/2003 | Henderson | 414/537 |
| 6,705,820 B2 | 3/2004 | Schilling | |
| 6,746,068 B1 | 6/2004 | Hurd | |
| 6,834,903 B2 | 12/2004 | Harper et al. | |
| 6,913,305 B1 | 7/2005 | Kern et al. | |
| 6,981,835 B1 | 1/2006 | Groth | |
| 7,033,119 B2 | 4/2006 | Baker et al. | |
| 7,048,483 B2 | 5/2006 | Brown | |
| 7,150,591 B1 | 12/2006 | Kent | |
| 2003/0072641 A1* | 4/2003 | Reed et al. | 414/537 |
| 2004/0219004 A1* | 11/2004 | Huggins | 414/537 |

FOREIGN PATENT DOCUMENTS

WO    WO 9110578 A1 *  7/1991

* cited by examiner

*Primary Examiner* — Saul Rodriguez
*Assistant Examiner* — Willie Berry, Jr.
(74) *Attorney, Agent, or Firm* — Pitts & Lake, P.C.

(57) ABSTRACT

Described is a loading ramp for loading a small vehicle into the bed of a truck, for being carried by the truck, and for optimizing storage space provided by the truck. The loading ramp is adapted to be mounted to a truck and is capable of an up position and a down position. When at the down position, the loading ramp defines a gradient between a ground surface and the bed of the truck. The gradient supports a small vehicle, such as an ATV, to the extent that the small vehicle is loaded into the bed of the truck by traversing the gradient. When at the up position, the loading ramp is carried by the truck such that the loading ramp does not limit the storage space provided by the truck and, in particular embodiments, makes available storage space provided by the truck that would otherwise be occupied.

21 Claims, 3 Drawing Sheets

LOADING RAMP ADAPTED TO BE CARRIED BY A TRUCK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a ramp for loading a small vehicle into a truck. More particularly, this invention pertains to a loading ramp adapted to be carried by the truck such the loading ramp optimizes the storage space provided by the truck.

2. Description of the Related Art

There exists a need for transporting a small vehicle, such as a lawnmower, an ATV, or a snowmobile, by way of a truck, such as a pickup truck or a sports utility vehicle, without utilizing a trailer. To satisfy this need, many inventions in the prior art, such as U.S. Pat. Nos. 6,913,305, 6,705,820, 5,807,058, 5,649,732, 5,603,600, 5,380,141, 4,990,049, 3,726,423, 3,720,335, 3,687,314, 3,704,794, and 3,613,920, provide a ramp that abuts the bed of a truck. More specifically, the ramp provides an incline between the ground and the bed of the truck. In accordance with these prior art inventions, the small vehicle is pushed, pulled, or driven from the ground, up the ramp, and into the bed of the truck. After the small vehicle is in the bed of the truck, the ramp is positioned to define a vertical wall of the bed, is removed from the pickup truck and stored elsewhere, or is transported in the bed. One limitation of these prior art inventions is that the ramp is either not transported by the pickup truck or is transported in the bed of the pickup truck, limiting the storage space provided by the pickup truck. Additionally, after being loaded into the truck, the small vehicle occupies the great majority of the bed of the truck such that other gear, supplies, tools, or equipment cannot be transported in the bed.

Other prior art inventions, such as U.S. Pat. Nos. 7,150,591, 5,393,191, and 5,380,141, also include a platform disposed within and secured to the bed of a truck such that a space is defined between the platform and the floor of the bed. In accordance with these prior art inventions, a small vehicle is pushed, pulled, or driven from the ground, up the ramp, and to the platform such that the small vehicle is positioned above the floor of the bed of the truck. Although, the space between the platform and the floor of the bed provides storage space at the floor of the bed, the space is limited by the structure of the platform. Additionally, positioning the small vehicle above the bed of the truck raises the center of gravity of the truck, making it more prone to tipping over and more difficult to manage while driving. Consequently, a ramp for loading a small vehicle into the bed of a truck, for being carried by the truck, and for not limiting the storage space provided by the truck is desired.

BRIEF SUMMARY OF THE INVENTION

In accordance with the various features of the present invention there is provided a loading ramp for loading a small vehicle into the bed of a truck, for being carried by the truck, and for optimizing storage space provided by the truck. More specifically, the loading ramp is capable of two positions, namely an up position and a down position. The loading ramp is mounted to a truck such that the loading ramp, when at the down position, defines a gradient between a ground surface and the bed of the truck. The gradient supports a small vehicle, such as a lawnmower, an ATV, or a snowmobile, to the extent that the small vehicle is loaded into the bed of the truck by traversing the gradient. When the small vehicle is in the bed of the truck, the loading ramp is moved to the up position. When the loading ramp is at the up position, the loading ramp is carried by the truck such that the loading ramp does not limit the storage space provided by the truck. In particular embodiments, when the loading ramp is at the up position, the loading ramp supports at least a portion of the small vehicle such that the loading ramp makes available storage space provided by the truck that would otherwise be occupied by the small vehicle. Stated differently, the present invention provides a loading ramp for loading a small vehicle into the bed of a truck, for being carried by the truck, and for optimizing storage space provided by the truck.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

The present invention provides a loading ramp for loading a small vehicle into the bed of a truck, for being carried by the truck, and for optimizing storage space provided by the truck. The loading ramp is adapted to be removably mounted to trucks of various sizes and is capable of an up position and a down position. When at the down position, the loading ramp defines a gradient between a ground surface and the bed of the truck. The gradient supports a small vehicle, such as an ATV, to the extent that the small vehicle is loaded into the bed of the truck by traversing the gradient. When at the up position, the loading ramp is carried by the truck such that the loading ramp does not limit the storage space provided by the truck and, in particular embodiments, makes available storage space provided by the truck that would otherwise be occupied. One embodiment of the loading ramp constructed in accordance with the various features of the present invention is illustrated generally at 10 in FIG. 1.

Figure 1:
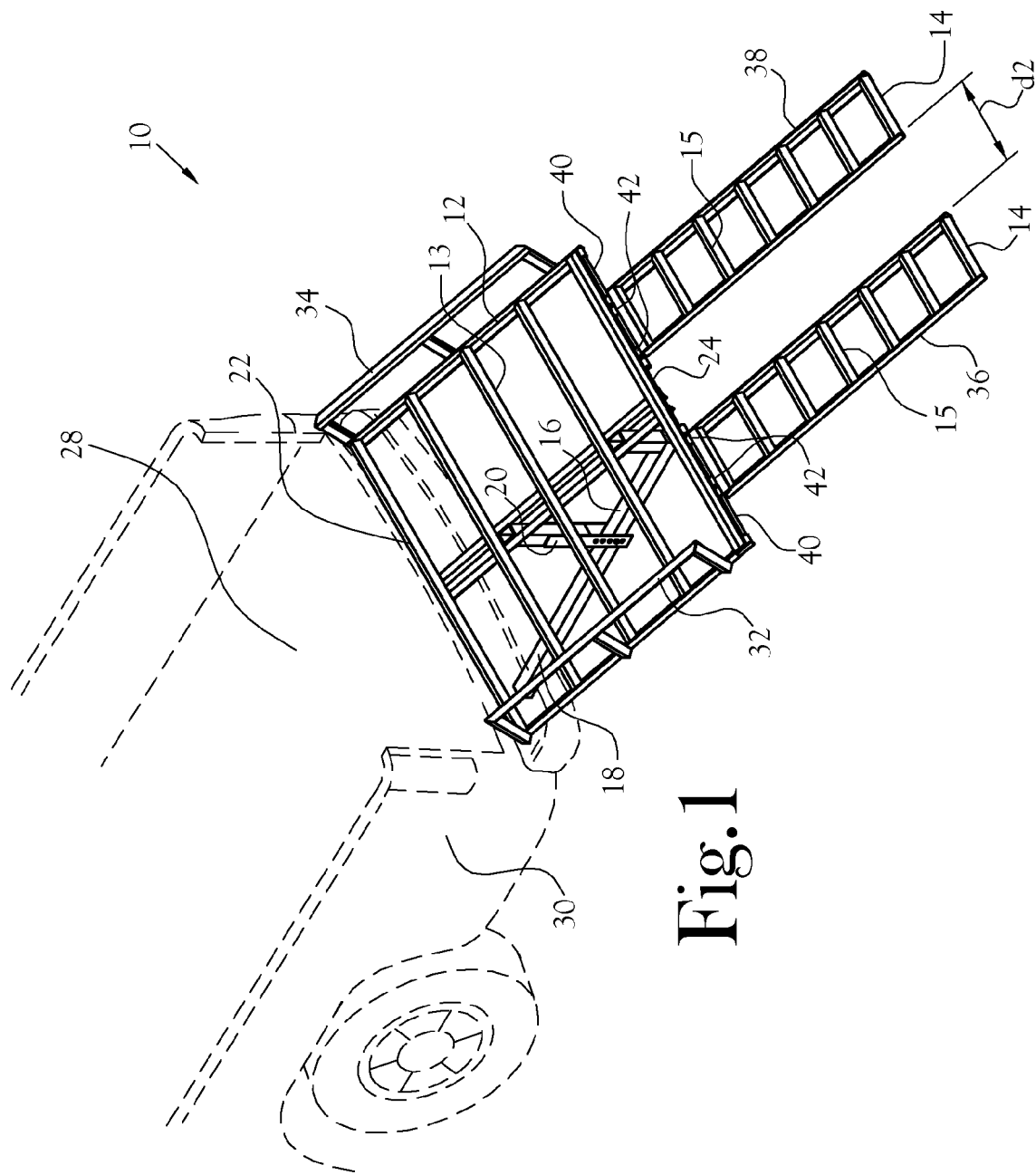
FIG. 1 is a perspective view of one embodiment of the loading ramp at the down position.

FIG. 1 illustrates one embodiment of the loading ramp 10 in accordance with the various features of the present invention. The loading ramp 10 includes a first gradient member 12, a second gradient member 14, and a support structure 16. The first gradient member 12 defines a first surface 13, which supports a small vehicle to the extent that the small vehicle can traverse the first surface 13. A small vehicle includes, but is not limited to, an ATV, a lawnmower, and a snowmobile. In the illustrated embodiment, the first surface 13 includes a plurality of crossing beams. It should be noted that the first surface 13 can be a surface other than one having a plurality of beams, such as a solid surface or a porous surface, without departing from the scope or spirit of the present invention. The first gradient member 12 defines a proximate end 22 and a distal end 24. The proximate end 22 is opposite the distal end 24 with respect to the first surface 13. In the illustrated embodiment, the first gradient member 12 includes a first rail 32 and a second rail 34. The first rail 32 and the second rail 34 run longitudinally between the proximate end 22 and the distal end 24 and are positioned opposite one another with respect to the first surface 13. The first rail 32 and the second rail 34 are to maintain the small vehicle at the first gradient member 12 in accordance with the subsequent discussion. It should be noted that the first gradient member 12 need not include the first rail 32 or the second rail 34 to remain within the scope and spirit of the present invention.

Figure 2:
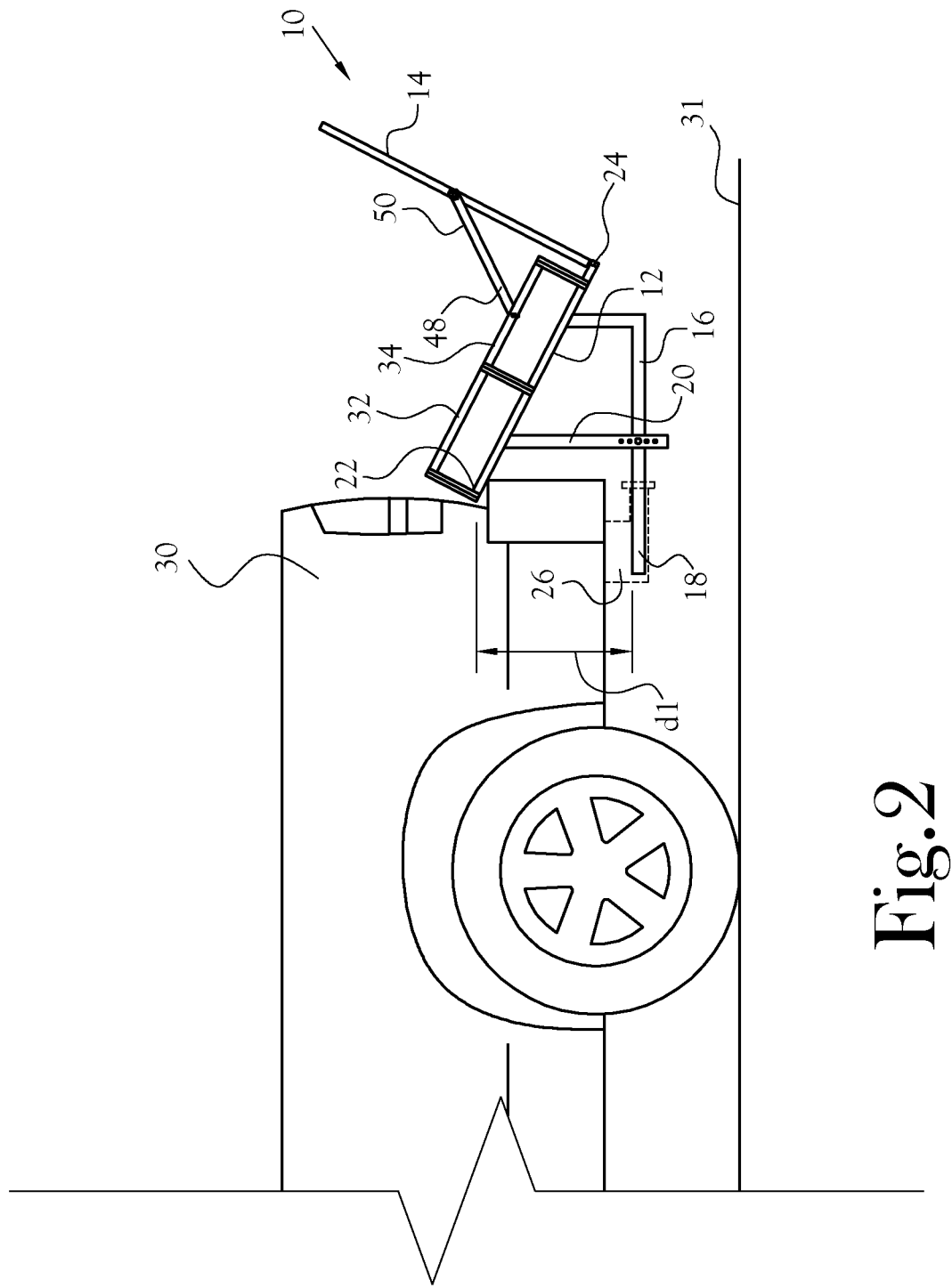
FIG. 2 illustrates the loading ramp of FIG. 1 at the up position.

Considering momentarily FIG. 2, the first gradient member 12 is secured to the support structure 16. The support structure 16 includes a mounting member 18 and an adjustable member 20. The mounting member 18 is adapted to be secured to a truck 30 having a bed 28 such that the support structure 16 is mounted to the truck 30. When the support structure 16 is mounted to the truck 30, the proximate end 22 of the first gradient member 12 is proximate the bed 28. In the illustrated embodiment, the mounting member 18 cooperates with a receiver-type hitch 26 included by the truck 30 such that the support structure 16 is removably mounted to the truck 30. The receiver-type hitch 26 includes any hitch having a receptacle for receiving an insertable structure such as a ball mount. It should be noted that the mounting member 18 can mount the support structure 16 to the truck 30 by ways other than by cooperating with a receiver-type hitch 26 without departing from the scope or spirit of the present invention. It should also be noted that the mounting member 18 can irremovably mount the support structure 16 to the truck 30 without departing from the scope or spirit of the present invention. Also, in the illustrated embodiment, the truck 30 is a pickup truck having its tailgate removed. It should be noted that the truck 30 can include vehicles other than a pickup truck, such as a sports utility vehicle, without departing from the scope or spirit of the present invention. When the truck 30 is a sports utility vehicle, the bed 28 is the storage space located behind the seating.

The adjustable member 20 adjusts the distance d1 between the proximate end 22 of the first gradient member 12 and the mounting member 18 such that the loading ramp 10 is adapted to be mounted to any size truck. More specifically, the adjustable member 20 adjusts the distance d1 such that the mounting member 18 is secured to the truck 30 and the proximate end 22 of the first gradient member 12 is positioned at the bed 28 of the truck 30. In the illustrated embodiment, the proximate end 22 of the gradient member 12 rests on a rear bumper 29 of the truck 30. However, it should be noted that the proximate end 22 of the gradient member 12 can rest on the bed 28 of the truck 30 or not rest on the truck 30 at all without departing from the scope or spirit of the present invention.

In the illustrated embodiment, the adjustable member 20 has a pin and slot configuration. However, it should be noted that the adjustable member 20 can adjust the distance d1 by ways other than utilizing a pin and slot configuration without departing from the scope or spirit of the present invention.

Returning to FIG. 1, the second gradient member 14 is secured to the first gradient member 12 at the distal end 24 of the first gradient member 12. The second gradient member 14 defines a second surface 15, which supports the small vehicle to the extent that the small vehicle can traverse the second surface 15. In the illustrated embodiment, the second surface 15 includes a plurality of beams. It should be noted that the second surface 15 can be a surface other than one having a plurality of beams, such as a solid surface or a porous surface, without departing from the scope or spirit of the present invention. Also, in the illustrated embodiment, the second gradient member 14 includes a left gradient member 36 and a right gradient member 38. It should be noted that the second gradient member 14 can include one or more gradient members without departing from the scope or spirit of the present invention. The left gradient member 36 and the right gradient member 38 are positioned a distance d2 from one another. In the illustrated embodiment, the left gradient member 36 and the right gradient member 38 are secured to the first gradient member 12 such that the distance d2 between the left gradient member 36 and the right gradient member 38 is adjustable. More specifically, in the illustrated embodiment, the left gradient member 36 and the right gradient member 38 define respective openings 42, which receive a rod 40 included by the first gradient member 12 to the extent that the left gradient member 36 and the right gradient member 38 are secured to the first gradient member 12 such that the left gradient member 36 and the right gradient member 38 slide laterally along the rod 40. Consequently, the left gradient member 36 and the right gradient member 38 are adjusted to accommodate various small vehicles having different wheelbases.

The second gradient member 14 is secured to the first gradient member 12 such that the second gradient member 14 pivots at the distal end 24 to the extent that the second gradient member 14 is capable of at least two positions, namely an up position and a down position. In FIG. 1, the second gradient member 14 is at the down position. When the second gradient member 14 is at the down position, the first gradient member 12 and the second gradient member 14 define a gradient between a ground surface 31 and the bed 28 of the truck 30; the gradient being traversable by the small vehicle. The small vehicle is loaded into the bed 28 of the truck 30 by pushing, pulling, or driving the small vehicle from the ground surface 31, up the gradient defined by the first gradient member 12 and the second gradient member 14, and to the bed 28. The small vehicle is unloaded from the bed 28 of the truck 30 by pushing, pulling, or driving the small vehicle from the bed 28, down the gradient, and to the ground surface 31.

After the small vehicle has been loaded or unloaded, the second gradient member 14 is moved to the up position. FIG. 2 illustrates the loading ramp 10 at the up position. The second gradient member 14 is moved between the up position and the down position either manually or by way of a mechanical device. The mechanical device includes, but is not limited to, motorized and crank-powered mechanical devices. The second gradient member 14 is adapted to be temporarily locked at the up position. In the illustrated embodiment, the second gradient member 14 is temporarily locked at the up position by a first locking member 48 and a second locking member 50. More specifically, the first locking member 48 is a beam rotatably secured to the first rail 32 and releasably secured to the second gradient member 14. Similarly, the second locking member 50 is a beam rotatably secured to the second rail 34 and releasably secured to the second gradient member 14. It should be noted that each of the first locking member 48 and the second locking member 50 can be a structure other than a beam, such as a chain, without departing from the scope or spirit of the present invention. It should also be noted that the second gradient member 14 can be locked at the up position by ways other than the first locking member 48 and the second locking member 50, such as by way of a locking motorized or crank-powered mechanical device, without departing from the scope or spirit of the present invention.

When the support structure 16 is mounted to the truck 30 and the second gradient member 14 is at the up position, the support structure 16 supports the first gradient member 12 and the second gradient member 14 above the ground surface 31 such that the loading ramp 10 is carried by the truck 30. Additionally, when the second gradient member 14 is at the up position, the loading ramp 10 does not limit the storage space provided by the truck 30. More specifically, the loading ramp 10 occupies no portion of the bed 28 or the cap of the truck 30 and does not limit the height of the cargo transported in the bed 28.

The result of the above-discussed features is a portable loading ramp 10 for loading and unloading a small vehicle with respect to the bed 28 of the truck 30 and for not limiting the storage space provided by the truck 30. For example, when the second gradient member 14 is at the down position, the small vehicle is loaded into the bed 28 by way of the loading ramp 10 in accordance with the above-discussion. When the small vehicle is in the bed 28, the second gradient member 14 is moved to and locked at the up position in accordance with the above-discussion. At this point, both the small vehicle and the loading ramp 10 are carried by the truck 30. Additionally, the loading ramp 10 is not limiting the storage space provided by the truck 30. To unload the small vehicle from the bed 28, the second gradient member 14 is unlocked from the up position and is moved to the down position in accordance with the above-discussion. The small vehicle is then unloaded from the truck 30 by way of the loading ramp 10 in accordance with the above-discussion. When the small vehicle is back at the ground surface 31, the second gradient member 14 is positioned and locked at the up position such that the loading ramp 10 is carried by the truck 30.

Figure 3:
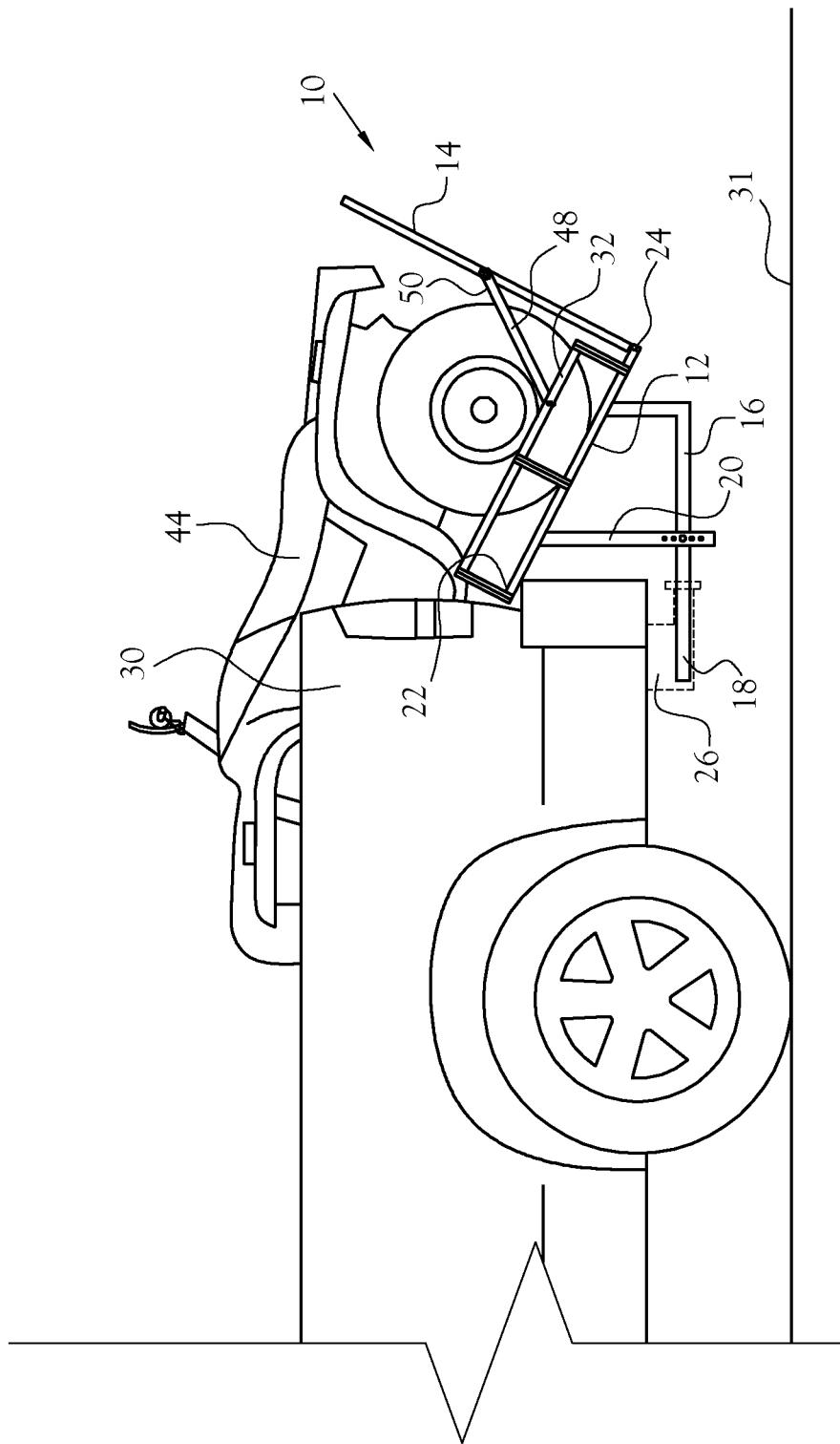
FIG. 3 illustrates the loading ramp of FIG. 1 at the up position and supporting a small vehicle.

FIG. 3 illustrates an additional feature of the loading ramp 10 in accordance with the various features of the present invention. In FIG. 3, the second gradient member 14 is at the up position and a portion of the small vehicle 44 is positioned in the bed 28 of the truck 30 and a portion of the small vehicle 44 is positioned at the first gradient member 12 of the loading ramp 10. When the small vehicle 44 is positioned as described, the truck 30 carries both the small vehicle 44 and the loading ramp 10 such that the small vehicle 44 occupies a minimal portion of the bed 28 of the truck 30. Consequently, the loading ramp 10 makes available storage space provided by the truck 30 that would otherwise be occupied by the small vehicle 44. As a result, the loading ramp 10 optimizes the storage space provided by the truck 30.

From the foregoing description, those skilled in the art will recognize that a loading ramp for loading a small vehicle into the bed of a truck, for being carried by the truck, and for optimizing storage space provided by the truck offering advantages over the prior art has been provided. The loading ramp is adapted to be removably mounted to trucks of various sizes and is capable of an up position and a down position. When at the down position, the loading ramp defines a gradient between a ground surface and the bed of the truck. The gradient supports a small vehicle, such as an ATV, to the extent that the small vehicle is loaded into the bed of the truck by traversing the gradient. When at the up position, the loading ramp is carried by the truck such that the loading ramp does not limit the storage space provided by the truck and, in particular embodiments, makes available storage space provided by the truck that would otherwise be occupied.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A loading ramp, said loading ramp comprising:
    a support structure having a mounting member, said mounting member being compatible with a truck having a bed such that said support structure is adapted to be removably mounted to the truck;
    a first gradient member secured to said support structure, said first gradient member defining a first surface, a proximate end, and a distal end, the proximate end being opposite the distal end with respect to the first surface, the proximate end being proximate the bed of the truck when said support structure is mounted to the truck, the first surface being structured to support a small vehicle; and
    a second gradient member secured to said first gradient member at the distal end such that said second gradient member pivots at the distal end to the extent that said second gradient member is capable of an up position and a down position, said second gradient member defining a second surface, the second surface being structured to support the small vehicle;
    said first gradient member and said second gradient member defining a gradient between a ground surface and the bed of the truck when said second gradient member is at the down position and said support structure is mounted to the truck, the gradient being traversable by the small vehicle,
    said loading ramp being carried by the truck when said second gradient member is at the up position and said support structure is mounted to the truck, said first gradient member supporting at least a portion of the small vehicle when said second gradient member is in the up position and said loading ramp and the small vehicle are carried by the truck, said loading ramp not limiting the storage space provided by the truck when said loading ramp is carried by the truck.

2. The loading ramp of claim 1 wherein said loading ramp makes available storage space provided by the truck otherwise occupied when said loading ramp and the small vehicle are carried by the truck.

3. The loading ramp of claim 1 wherein said support structure is adjustable such that the proximate end of said first gradient member is proximate the bed of the truck when said support structure is mounted to the truck regardless of the size of the truck.

4. The loading ramp of claim 1 wherein the proximate end of said first gradient member rests against a rear bumper of the truck when said support structure is mounted to the truck.

5. The loading ramp of claim 1 wherein the proximate end of said first gradient member rests against the bed of the truck when said support structure is mounted to the truck.

6. The loading ramp of claim 1 wherein said second gradient member includes a plurality of gradient members.

7. The loading ramp of claim 6, wherein said second gradient member includes a left gradient member and a right gradient member.

8. The loading ramp of claim 7, wherein the distance between said left gradient member and said right gradient member is adjustable.

9. The loading ramp of claim 7, wherein said second gradient member includes a center gradient member.

10. The loading ramp of claim 1 wherein said first gradient member includes a first rail and a second rail running longitudinally between the proximate end and the distal end, said first rail being disposed opposite said second rail with respect to the first surface.

11. The loading ramp of claim 1 further comprising a mechanical device, said mechanical device directly moving said second gradient member between the up position and down position.

12. The loading ramp of claim 1 further comprising a locking member, said locking member locking said second gradient member at the up position.

13. A loading ramp, said loading ramp comprising:
a support structure having a mounting member, said mounting member being compatible with a truck having a bed such that said support structure is adapted to be removably mounted to the truck;
a first gradient member secured to said support structure, said first gradient member defining a first surface, a proximate end, and a distal end, the proximate end being opposite the distal end with respect to the first surface, the proximate end being proximate the bed of the truck when said support structure is mounted to the truck, the distal end having a lower elevation than the proximate end with respect to the bed of the truck when said support structure is mounted to the truck; and
a second gradient member secured to said first gradient member at the distal end, said second gradient member defining a second surface, said second gradient member being adapted to pivot at the distal end of said first gradient member so that said second gradient member is capable of an up position and a down position when said support structure is mounted to the truck,
said second gradient member being substantially co-linear with said first gradient member when said second gradient member is in the down position, and said first gradient member and said second gradient member defining a gradient between a ground surface and the bed of the truck when said second gradient member is in the down position, the gradient being traversable by a small vehicle, and
said second gradient member being substantially orthogonal to said first gradient member when said second gradient member is in the up position, said loading ramp being carried by the truck when said second gradient member is in the up position, said first gradient member supporting at least a portion of the small vehicle when said second gradient member is in the up position and the small vehicle is being carried by the truck.

14. The loading ramp of claim 13, wherein when a small vehicle is loaded into the truck said first gradient member supports at least part of the weight of the small vehicle.

15. The loading ramp of claim 14, wherein when a small vehicle is loaded into the truck said second gradient member supports part of the weight of the small vehicle.

16. The loading ramp of claim 13, wherein said loading ramp makes available storage space provided by the truck otherwise occupied when said loading ramp and the small vehicle are carried by the truck.

17. The loading ramp of claim 13, wherein the length of said first gradient member is substantially the same as the length of said second gradient member.

18. A loading ramp and bed extension adapted to be secured to a vehicle having a bed with an open end and a floor, said loading ramp and bed extension comprising:
a first member having a first end and a second end, said first end adapted to rest in a selected position in close proximity to the open end of the bed and at a substantially equal elevation with the floor of the bed when said loading ramp and bed extension is secured to the vehicle having a bed, said second end adapted to rest in a selected position distal from the open end of the bed and at an elevation lower than the floor of the bed when said loading ramp and bed extension is secured to the vehicle, said first member adapted to cooperate with the bed of the vehicle to define a support surface for a small vehicle when said loading ramp and bed extension is secured to the vehicle having a bed;
a second member pivotally connected to said second end of said first member, said second member having a free end, said second member being movable between a ramp position and a gate position, said free end engaging the ground when said second member is in said ramp position, said free end being at least substantially orthogonal to said first member when said second member is in said gate position, said first member supporting at least a portion of the small vehicle when said second gradient member is in the up position; and
a mounting member for securing said loading ramp and bed extension to the vehicle having a bed.

19. The loading ramp and bed extension of claim 18, wherein said mounting member comprises a base member adapted to be secured to the vehicle having a bed, a first support arm connected to said first member proximate to said first end, and a second support arm connected to said first member proximate to said second end.

20. The loading ramp and bed extension of claim 19, wherein said first support arm and said second support arm are pivotally connected to said first member, said first support arm being adjustably secured to said base member to allow selection of the angle of said first member relative to the bed of the vehicle having a bed.

21. The loading ramp and bed extension of claim 18, wherein said loading ramp and bed extension is removably secured to the vehicle having a bed.

* * * * *